(12) United States Patent
Michaels et al.

(10) Patent No.: US 8,363,830 B2
(45) Date of Patent: *Jan. 29, 2013

(54) CRYPTOGRAPHIC SYSTEM CONFIGURED TO PERFORM A MIXED RADIX CONVERSION WITH A PRIORI DEFINED STATISTICAL ARTIFACTS

(75) Inventors: Alan J. Michaels, West Melbourne, FL (US); David B. Chester, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 1022 days.

This patent is subject to a terminal disclaimer.

(21) Appl. No.: 12/027,658

(22) Filed: Feb. 7, 2008

(65) Prior Publication Data

US 2009/0202067 A1    Aug. 13, 2009

(51) Int. Cl.
*H04L 9/00* (2006.01)

(52) U.S. Cl. ......................................................... 380/42

(58) Field of Classification Search ...................... 380/42
See application file for complete search history.

(56) References Cited

U.S. PATENT DOCUMENTS

| | | | |
|---|---|---|---|
| 3,564,223 A | 2/1971 | Harris et al. | |
| 4,095,778 A | 6/1978 | Wing | |
| 4,646,326 A | 2/1987 | Backof, Jr. et al. | |
| 4,703,507 A | 10/1987 | Holden | |
| 4,893,316 A | 1/1990 | Janc et al. | |
| 5,007,087 A | 4/1991 | Bernstein et al. | |
| 5,048,086 A | 9/1991 | Bianco et al. | |
| 5,077,793 A | 12/1991 | Falk et al. | |
| 5,210,770 A | 5/1993 | Rice | |
| 5,276,633 A | 1/1994 | Fox et al. | |
| 5,297,153 A | 3/1994 | Baggen et al. | |
| 5,297,206 A | 3/1994 | Orton | |

(Continued)

FOREIGN PATENT DOCUMENTS

| | | |
|---|---|---|
| EP | 0 849 664 A2 | 6/1998 |
| EP | 0 949 563 | 10/1999 |

(Continued)

OTHER PUBLICATIONS

Aparicio; "Communications Systems Based on Chaos" May 2007. Universidad Rey Juan Carlos.

(Continued)

*Primary Examiner* — Ashok Patel
*Assistant Examiner* — Lawrence Cosby
(74) *Attorney, Agent, or Firm* — Fox Rothschild, LLP; Robert J. Sacco

(57) ABSTRACT

A cryptographic system (CS) is provided. The CS (800) comprises a data stream receiving means (DSRM), a generator (702), a mixed radix converter (MRC) and an encryptor (908). The DSRM (902) is configured to receive a data stream (DS). The generator is configured to selectively generate a random number sequence (RNS) utilizing a punctured ring structure. The MRC (704) is coupled to the generator and configured to perform a mixed radix conversion to convert the RNS from a first number base to a second number base. The encryptor is coupled to the DSRM and MRC. The encryptor is configured to generate an altered data stream by combining the RNS in the second number base with the DS. The punctured ring structure and the MRC are configured in combination to produce an RNS in the second number base which contains a priori defined statistical artifacts after the mixed radix conversion.

19 Claims, 10 Drawing Sheets

U.S. PATENT DOCUMENTS

| | | | |
|---|---|---|---|
| 5,319,735 A | 6/1994 | Preuss et al. | |
| 5,412,687 A | 5/1995 | Sutton et al. | |
| 5,596,600 A | 1/1997 | Dimos et al. | |
| 5,598,476 A | 1/1997 | LaBarre et al. | |
| 5,677,927 A | 10/1997 | Fullerton et al. | |
| 5,680,462 A | 10/1997 | Miller et al. | |
| 5,757,923 A | 5/1998 | Koopman, Jr. | |
| 5,811,998 A | 9/1998 | Lundberg et al. | |
| 5,852,630 A | 12/1998 | Langberg et al. | |
| 5,900,835 A | 5/1999 | Stein | |
| 5,923,760 A | 7/1999 | Abarbanel et al. | |
| 5,924,980 A | 7/1999 | Coetzee | |
| 5,937,000 A | 8/1999 | Lee et al. | |
| 6,014,446 A | 1/2000 | Finkelstein | |
| 6,023,612 A | 2/2000 | Harris et al. | |
| 6,038,317 A * | 3/2000 | Magliveras et al. | 380/28 |
| 6,078,611 A | 6/2000 | La Rosa et al. | |
| 6,141,786 A | 10/2000 | Cox et al. | |
| 6,212,239 B1 | 4/2001 | Hayes | |
| 6,304,216 B1 | 10/2001 | Gronemeyer | |
| 6,304,556 B1 | 10/2001 | Haas | |
| 6,310,906 B1 | 10/2001 | Abarbanel et al. | |
| 6,314,187 B1 | 11/2001 | Menkhoff et al. | |
| 6,331,974 B1 | 12/2001 | Yang et al. | |
| 6,377,782 B1 | 4/2002 | Bishop et al. | |
| 6,473,448 B1 | 10/2002 | Shono et al. | |
| 6,570,909 B1 | 5/2003 | Kansakoski et al. | |
| 6,614,914 B1 | 9/2003 | Rhoads et al. | |
| 6,665,692 B1 | 12/2003 | Nieminen | |
| 6,744,893 B1 | 6/2004 | Fleming-Dahl | |
| 6,754,251 B1 | 6/2004 | Sriram et al. | |
| 6,766,345 B2 * | 7/2004 | Stein et al. | 708/492 |
| 6,842,479 B2 | 1/2005 | Bottomley | |
| 6,842,745 B2 | 1/2005 | Occhipinti et al. | |
| 6,864,827 B1 | 3/2005 | Tise et al. | |
| 6,865,218 B1 | 3/2005 | Sourour | |
| 6,888,813 B1 | 5/2005 | Kishi | |
| 6,901,104 B1 | 5/2005 | Du et al. | |
| 6,937,568 B1 | 8/2005 | Nicholl et al. | |
| 6,980,656 B1 | 12/2005 | Hinton, Sr. et al. | |
| 6,980,657 B1 | 12/2005 | Hinton, Sr. et al. | |
| 6,986,054 B2 | 1/2006 | Kaminaga et al. | |
| 6,993,016 B1 | 1/2006 | Liva et al. | |
| 6,999,445 B1 | 2/2006 | Dmitriev et al. | |
| 7,023,323 B1 | 4/2006 | Nysen | |
| 7,027,598 B1 | 4/2006 | Stojancic et al. | |
| 7,035,220 B1 | 4/2006 | Simcoe | |
| 7,069,492 B2 | 6/2006 | Piret et al. | |
| 7,076,065 B2 | 7/2006 | Sherman et al. | |
| 7,078,981 B2 | 7/2006 | Farag | |
| 7,079,651 B2 | 7/2006 | Den Boer et al. | |
| 7,095,778 B2 | 8/2006 | Okubo et al. | |
| 7,133,522 B2 | 11/2006 | Lambert | |
| 7,170,997 B2 | 1/2007 | Petersen et al. | |
| 7,190,681 B1 * | 3/2007 | Wu | 370/316 |
| 7,200,225 B1 | 4/2007 | Schroeppel | |
| 7,233,969 B2 | 6/2007 | Rawlins et al. | |
| 7,233,970 B2 | 6/2007 | North et al. | |
| 7,245,723 B2 | 7/2007 | Hinton, Sr. et al. | |
| 7,269,198 B1 | 9/2007 | Elliott et al. | |
| 7,269,258 B2 | 9/2007 | Ishihara et al. | |
| 7,272,168 B2 | 9/2007 | Akopian | |
| 7,277,540 B1 | 10/2007 | Shiba et al. | |
| 7,286,802 B2 | 10/2007 | Beyme et al. | |
| 7,310,309 B1 | 12/2007 | Xu | |
| 7,349,381 B1 | 3/2008 | Clark et al. | |
| 7,423,972 B2 | 9/2008 | Shaham et al. | |
| 7,529,292 B2 | 5/2009 | Bultan et al. | |
| 7,643,537 B1 | 1/2010 | Giallorenzi et al. | |
| 7,725,114 B2 | 5/2010 | Feher | |
| 7,779,060 B2 | 8/2010 | Kocarev et al. | |
| 7,830,214 B2 | 11/2010 | Han et al. | |
| 7,853,014 B2 | 12/2010 | Blakley et al. | |
| 7,929,498 B2 | 4/2011 | Ozluturk et al. | |
| 7,970,809 B2 * | 6/2011 | Michaels et al. | 708/250 |
| 7,974,146 B2 | 7/2011 | Barkley | |
| 2001/0017883 A1 | 8/2001 | Tiirola et al. | |
| 2002/0034191 A1 | 3/2002 | Shattil | |
| 2002/0034215 A1 | 3/2002 | Inoue et al. | |
| 2002/0041623 A1 | 4/2002 | Umeno | |
| 2002/0054682 A1 | 5/2002 | Di Bernardo et al. | |
| 2002/0094797 A1 | 7/2002 | Marshall et al. | |
| 2002/0099746 A1 | 7/2002 | Tie et al. | |
| 2002/0110182 A1 | 8/2002 | Kawai | |
| 2002/0115461 A1 | 8/2002 | Shiraki et al. | |
| 2002/0122465 A1 | 9/2002 | Agee et al. | |
| 2002/0128007 A1 | 9/2002 | Miyatani | |
| 2002/0172291 A1 | 11/2002 | Maggio et al. | |
| 2002/0176511 A1 | 11/2002 | Fullerton et al. | |
| 2002/0186750 A1 | 12/2002 | Callaway et al. | |
| 2003/0007639 A1 | 1/2003 | Lambert | |
| 2003/0016691 A1 | 1/2003 | Cho | |
| 2003/0044004 A1 | 3/2003 | Blakley et al. | |
| 2003/0156603 A1 | 8/2003 | Rakib et al. | |
| 2003/0182246 A1 | 9/2003 | Johnson et al. | |
| 2003/0198184 A1 | 10/2003 | Huang et al. | |
| 2004/0001556 A1 | 1/2004 | Harrison et al. | |
| 2004/0059767 A1 | 3/2004 | Liardet | |
| 2004/0092291 A1 | 5/2004 | Legnain et al. | |
| 2004/0100588 A1 | 5/2004 | Hartson et al. | |
| 2004/0146095 A1 | 7/2004 | Umeno et al. | |
| 2004/0156427 A1 | 8/2004 | Gilhousen et al. | |
| 2004/0161022 A1 | 8/2004 | Glazko et al. | |
| 2004/0165681 A1 | 8/2004 | Mohan | |
| 2004/0184416 A1 | 9/2004 | Woo | |
| 2004/0196212 A1 | 10/2004 | Shimizu | |
| 2004/0196933 A1 | 10/2004 | Shan et al. | |
| 2005/0004748 A1 | 1/2005 | Pinto et al. | |
| 2005/0021308 A1 | 1/2005 | Tse et al. | |
| 2005/0031120 A1 * | 2/2005 | Samid | 380/28 |
| 2005/0050121 A1 | 3/2005 | Klein et al. | |
| 2005/0075995 A1 | 4/2005 | Stewart et al. | |
| 2005/0089169 A1 | 4/2005 | Kim et al. | |
| 2005/0129096 A1 | 6/2005 | Zhengdi et al. | |
| 2005/0207574 A1 | 9/2005 | Pitz et al. | |
| 2005/0249271 A1 | 11/2005 | Lau et al. | |
| 2005/0259723 A1 | 11/2005 | Blanchard | |
| 2005/0265430 A1 | 12/2005 | Ozluturk et al. | |
| 2005/0274807 A1 | 12/2005 | Barrus et al. | |
| 2006/0072754 A1 | 4/2006 | Hinton et al. | |
| 2006/0088081 A1 | 4/2006 | Withington et al. | |
| 2006/0093136 A1 | 5/2006 | Zhang et al. | |
| 2006/0123325 A1 * | 6/2006 | Wilson et al. | 714/781 |
| 2006/0209926 A1 | 9/2006 | Umeno et al. | |
| 2006/0209932 A1 | 9/2006 | Khandekar et al. | |
| 2006/0239334 A1 | 10/2006 | Kwon et al. | |
| 2006/0251250 A1 | 11/2006 | Ruggiero et al. | |
| 2006/0264183 A1 | 11/2006 | Chen et al. | |
| 2007/0098054 A1 | 5/2007 | Umeno | |
| 2007/0121945 A1 | 5/2007 | Han et al. | |
| 2007/0133495 A1 | 6/2007 | Lee et al. | |
| 2007/0149232 A1 | 6/2007 | Koslar | |
| 2007/0195860 A1 | 8/2007 | Yang et al. | |
| 2007/0201535 A1 | 8/2007 | Ahmed | |
| 2007/0230701 A1 | 10/2007 | Park et al. | |
| 2007/0253464 A1 | 11/2007 | Hori et al. | |
| 2007/0291833 A1 | 12/2007 | Shimanskiy | |
| 2008/0008320 A1 | 1/2008 | Hinton et al. | |
| 2008/0016431 A1 | 1/2008 | Lablans | |
| 2008/0075195 A1 | 3/2008 | Pajukoski et al. | |
| 2008/0080439 A1 | 4/2008 | Aziz et al. | |
| 2008/0084919 A1 | 4/2008 | Kleveland et al. | |
| 2008/0095215 A1 | 4/2008 | McDermott et al. | |
| 2008/0107268 A1 | 5/2008 | Rohde et al. | |
| 2008/0198832 A1 | 8/2008 | Chester | |
| 2008/0204306 A1 | 8/2008 | Shirakawa | |
| 2008/0263119 A1 | 10/2008 | Chester et al. | |
| 2008/0294710 A1 | 11/2008 | Michaels | |
| 2008/0294956 A1 | 11/2008 | Chester et al. | |
| 2008/0304553 A1 | 12/2008 | Zhao et al. | |
| 2008/0304666 A1 | 12/2008 | Chester et al. | |
| 2008/0307022 A1 * | 12/2008 | Michaels et al. | 708/204 |
| 2008/0307024 A1 | 12/2008 | Michaels et al. | |
| 2009/0022212 A1 | 1/2009 | Ito et al. | |
| 2009/0034727 A1 | 2/2009 | Chester et al. | |
| 2009/0044080 A1 | 2/2009 | Michaels et al. | |
| 2009/0059882 A1 | 3/2009 | Hwang et al. | |

| | | |
|---|---|---|
| 2009/0110197 A1 | 4/2009 | Michaels |
| 2009/0122926 A1 | 5/2009 | Azenkot et al. |
| 2009/0196420 A1 | 8/2009 | Chester et al. |
| 2009/0202067 A1 | 8/2009 | Michaels et al. |
| 2009/0245327 A1 | 10/2009 | Michaels |
| 2009/0279688 A1 | 11/2009 | Michaels et al. |
| 2009/0279690 A1 | 11/2009 | Michaels et al. |
| 2009/0285395 A1 | 11/2009 | Hu et al. |
| 2009/0296860 A1 | 12/2009 | Chester et al. |
| 2009/0300088 A1 | 12/2009 | Michaels et al. |
| 2009/0309984 A1 | 12/2009 | Bourgain et al. |
| 2009/0310650 A1 | 12/2009 | Chester et al. |
| 2009/0316679 A1 | 12/2009 | Van Der Wateren |
| 2009/0323766 A1 | 12/2009 | Wang et al. |
| 2009/0327387 A1 | 12/2009 | Michaels et al. |
| 2010/0030832 A1 | 2/2010 | Mellott |
| 2010/0054225 A1 | 3/2010 | Hadef et al. |
| 2010/0073210 A1 | 3/2010 | Bardsley et al. |
| 2010/0111296 A1 | 5/2010 | Brown et al. |
| 2010/0142593 A1 | 6/2010 | Schmid |
| 2010/0254430 A1 | 10/2010 | Lee et al. |
| 2010/0260276 A1 | 10/2010 | Orlik et al. |
| 2011/0222393 A1 | 9/2011 | Kwak et al. |

FOREIGN PATENT DOCUMENTS

| | | |
|---|---|---|
| EP | 2 000 900 A2 | 12/2008 |
| EP | 2 000 902 A2 | 12/2008 |
| GB | 1167272 A | 10/1969 |
| JP | 7140983 A | 6/1995 |
| JP | 2001255817 A | 9/2001 |
| JP | 2004279784 A | 10/2004 |
| JP | 2004343509 A | 12/2004 |
| JP | 2005017612 A | 1/2005 |
| WO | WO-0135572 A2 | 5/2001 |
| WO | WO-2006 110954 | 10/2006 |
| WO | WO 2008 065191 | 6/2008 |
| WO | WO-2008099367 A2 | 8/2008 |
| WO | WO-2008130973 A1 | 10/2008 |
| WO | WO 2009 146283 | 12/2009 |

OTHER PUBLICATIONS

Bererber, S.M., et al., "Design of a CDMA Sysetm in FPGA Technology", Vehicular Technology Conference, 2007. VTC2007-Spring. IEEE 65th Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].

Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA, IEEE, Mar. 16, 2004, pp. 1-1_1, XP010715117 ISBN: 978-977-5031-77-8.

Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.

Soobul, Y., et al. "Digital chaotic coding and modulation in CDMA" IEEE AFRICON Oct. 2, 2002, Oct. 4, 2002, pp. 841-846, XP002575052 Retrieved from the Internet: URL:http://ieeexplore.ieee.org> [retrieved on Mar. 23, 2010].

Rabiner, Lawrence R., "A Tutorial on Hidden Markov Models and Selected Applications in Speech Recognition", Proceedings of the IEEE, vol. 77, No. 2, Feb. 1989.

Boyar, "Inferring Sequences Produce by Pseudo-Random Number Generators", Journal of the Associate for Computing Machine, vol. 36, No. 1, pp. 20-41, 1989.

Barile, M., "Bijective", From MathWorld—A Wolfram Web Resource, created by Eric W. Weisstein, [online] [retrieved on Nov. 8, 2010] Retrieved from the Internet: <http://mathworld.wolfram.com/Bijective.html>.

Weisstein, E., Surejection:, From MathWorld—A Wolfram Web Resource [online] [retrieved on Nov. 8, 2010] Retrieved from the Internet: <http://mathworld.wolfram.com/injection.html>.

Weisstein, E., Surejection:, From MathWorld—A Wolfram Web Resource [online] [retrieved on Nov. 8, 2010] Retrieved from the Internet: http://mathworld.wolfram.com/injection.html>.

Harris Corp., International Search Report mailed Feb. 11, 2010, Application Serial No. PCT/US2009/059948.

Harris Corp., International Search Report mailed Apr. 13, 2010, Application Serial No. PCT/US2009/0069121.

Harris Corp., International Search Report mailed Apr. 13, 2010, Application Serial No. PCT/US2009/0069118.

Harris Corp., European Search Report mailed Mar. 4, 2010, Patent Application No. 08009745.4.

U.S. Appl. No. 11/759,276, Michaels, Alan J.

Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004, XPOO2558039.

Taylor, F.J., "Residue Arithmetic A Tutorial with Examples", Computer, vol. 17, No. 5, pp. 50-62, May 1984, doi: 10.1109/MC. 1984. 1659138.

Barda, A; et al., "Chaotic signals for multiple access communications," Electrical and Electronics Engineers in Israel, 1995, Eighteenth Convention of, vol., No., pp. 2.1.3/1-2.1/3/5, Mar. 7-8, 1995.

Alia, G., et al., "A VLSI Algorithm for Direct and Reverse Conversion from Weighted Binary Number System to Residue Number System", IEEE Trans on Circuits and Systems, vol. Cas-31, No. 12, Dec. 1984.

Information about Related Patents and Patent Applications, see section 6 of the accompanying Information Disclosure Statement Letter, which concerns Related Patents and Patent Applications.

Menezes, Vanstone, Oorschot: "Handbook of Applied Cryptography", 1997, CRC Press LLC, USA, XP002636791, p. 80-p. 85, p. 238-242.

Schneier, Bruce: "Applied Cryptography Second Edition", 1997, John Wiley & Sons, USA, XP002636792, p. 254-p. 255.

Abel, et al., "Chaos Communications—Principles, Schemes, and System Analysis" Proceedings for the IEEE, IEEE. New York, NY. vol. 90, No. 5, May 1, 2002, XP011064997, ISSN: 0018-9219.

Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

Barile, Margherita, "Bijective," From MathWorld—A Wolfram Web Resource, created by Eric W. Weisstein. http://mathworld.wolfram.com/Bijective.html, May 29, 2007.

De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.

Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.

Knuth, D.E., "The Art of Computer Programming, Third Edition; vol. 2 Seminumerical Algorithms". Feb. 2005, Addison-Wesley, Boston 310200, XP002511903, pp. 142-146, 284-292.

Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.

Kolumban, et al., "Chaotic Communications with Correlator Receivers: Theory and Performance Limits" Proceedings of the IEEE, vol. 90, No. 5, May 2002.

Leung, et al., "Time-varying synchronization of chaotic systems in the presence of system mismatch" Physical Review E (Statistical, Nonlinear, and Soft Matter Physics) APS through AIP USA, [online]

Vo. 69, No. 2, Feb. 1, 2004, pp. 26201-1, XP002499416, ISSN: 1063-651X. Retrieved from the Internet: URL:http://prola.aps.org/pdf/PRE/v69/i2/e026201 [retrieved Oct. 13, 2008].

Manikandan, et al, "A Novel Pulse Based Ultrawide Band System Using Chaotic Spreading Sequences" Communication Systems Software and Middleware, 2007. COMSWARE 2007. 2nd International Conference on, IEEE, PI, Jan. 1, 2007, pp. 1-5, XP031113946 ISBN: 978-1-4244-0613; p. 1, p. 5.

Morsche et al., "Signals and Systems," lecture notes, University of Eindhoven, The Netherlands (1999).

Nakamura, et al, "Chaotic synchronization-based communications using constant envelope pulse" Electrical Engineering in Japan, [Online] vol. 163, No. 3, Feb. 12, 2008, pp. 47-56, XP002539977 Japan. Retrieved from the Internet: URL:http://www3.interscience.wiley.com/cgi-bin/fulltext/117910986/PDFSTART>; [retrieved on Aug. 4, 2009] p. 47-p. 48; p. 50-p. 51.

Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.

Pleszczynski, S, "On the Generation of Permutations" Information Processing Letters, Amsterdam, NL, vol. 3, No. 6, Jul. 1, 1975, pp. 180-183, XP008023810, ISSN: 0020-0190.

Pourbigharaz F. et al, Modulo-Free Architecture for Binary to Residue Transformation with Respect to (2m−1, 2m, 2m+1) Moduli Set, IEEE International Symposium on Circuits and Systems, May 30-Jun. 2, 1994, pp. 317-320, vol. 2, London, UK.

Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.

Vanwiggeren et al., "Chaotic Communication Using Time-Delayed Optical Systems", International Journal of Bifurcation and Chaos, vol. 9, No. 11 (1999), pp. 2129-2156, World Scientific Publishing Company.

Weisstein, Eric W., "Injection," From MathWorld—A Wolfram Web Resource. http://mathworld.wolfram.com/Injection.html, May 29, 2007.

Weisstein, Eric W. "Surjection," From MathWorld—A Wolfram Web Resource, http://mathworld.wolfram.com/Surjection.html, May 29, 2007.

Yen, et al., (1999) "Residual Number System Assisted CDMA: A New System Concept", In: ACTS'99, Jun. 8-11, 1999, Sorrento, Italy.

Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0-7803-6685-5.

Michaels, et al., U.S. Appl. No. 12/496,214, filed Jul. 1, 2009, entitled "Anti-Jam Communications Having Selectively Variable PAPR Including CAZAC Waveform".

Michaels, et al., U.S. Appl. No. 12/507,111, filed Jul. 22, 2009, entitled "Anti-Jam Communications Using Adaptive Chaotic Spread Waveform".

Chester, et al., U.S. Appl. No. 12/480,264, filed Jun. 8, 2009, entitled "Continuous Time Chaos Dithering".

Chester, et al., U.S. Appl. No. 12/481,704, filed Jun. 10, 2009, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Michaels, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled "Permission Based Multiple Access Communications Systems".

Michaels, et al., U.S. Appl. No. 12/496,233, filed Jul. 1, 2009, entitled "Permission-Based Secure Multiple Access Communication Systems Rotations".

Michaels, et al., U.S. Appl. No. 12/507,512, filed Jul. 22, 2009, entitled "Permission-Based TDMA Chaotic Communication Systems".

Micheals, et al., U.S. Appl. No. 12/496,085, filed Jul. 1, 2009, entitled, "High-Speed Cryptographic System Using Chaotic Sequences".

Michaels, et al., U.S. Appl. No. 12/496,123, filed Jul. 1, 2009, entitled, "Rake Receiver for Spread Spectrum Chaotic Communications Systems".

Michaels, et al., U.S. Appl. No. 12/496,146, filed Jul. 1, 2009, entitled "Improved Symbol Estimation for Chaotic Spread Spectrum Signal".

Micheals, et al., U.S. Appl. No. 12/480,316, filed Jun. 8, 2009, entitled "Symbol Duration Dithering for Secured Chaotic Communications".

Michaels, et al., U.S. Appl. No. 12/496,183, filed Jul. 1, 2009, entitled "Bit Error Rate Reduction in Chaotic Communications".

Michaels, Alan, U.S. Appl. No. 12/248,131, filed Oct. 9, 2008, entitled "Ad-hoc Network Acquisition Using Chaotic Sequence Spread Waveform".

Michaels, Alan, U.S. Appl. No. 12/201,021, filed Aug. 29, 2008, entitled, "Multi-Tier Ad-hoc Network Communications".

Diaz-Toca, G.M. and Lombardi, H. , Dynamic Galois Theory., Journal of Symbolic Computation; Dec. 2010, vol. 45 Issue 12, p. 1316-1329, 14p.

Galias, Z., et al., "Quadrature Chaos-Shift Keying: Theory and Performance Analysis", IEEE Transactions on Circuits and Systems Part I: Regular Papers, IEEE Service Center, New York, NY US, vol. 48, No. 12, Dec. 1, 2001 XP011012427; pp. 1510-1514.

International Search Report mailed Dec. 30, 2011, European Patent Application No. 11001222.6, in the name of Harris Corporation.

Abu-Khader, Nabil, Square Root Generator for Galois Field in Multiple-Valued Logic., Recent Patents on Electrical Engineering; Sep. 2011, vol. 4 Issue 3, p. 209-213, 5p, 2 Diagrams, 3 Charts.

Pirkin, Llya, Calculations in Galois Fields., C/C++ Users Journal; Oct. 2004, vol. 22 Issue 10, p. 14-18, 4p, 1 Color Photograph.

Popescu, Angel, A Galois Theory for the Field Extension K ((X))/K., Glasgow Mathematical Journal; Sep. 2010, vol. 52 Issue 3, p. 447-451, 5p.

Pirkin, Ilya, Calculations in Galois Fields., C/C++ Users Journal; Oct. 2004, vol. 22 Issue 10, p. 14-18, 4p, 1 Color Photograph.

Japanese Office Action dated Aug. 29, 2012, Application Serial No. 2011-531166 in the name of Harris Corporation.

Office Action issued in Japanese Patent Application No. 2010-504206 in the name of Harris Corporation; mailed Jan. 6, 2012.

Bender, et al., "Techniques for data hiding", 1995, IBM Systems Journal, vol. 35, pp. 313-336.

* cited by examiner

CRYPTOGRAPHIC SYSTEM CONFIGURED TO PERFORM A MIXED RADIX CONVERSION WITH A PRIORI DEFINED STATISTICAL ARTIFACTS

BACKGROUND OF THE INVENTION

1. Statement of the Technical Field

The inventive arrangements relate to cryptographic systems having ring generators. More particularly, the inventive arrangements relate to a cryptographic system comprising a ring generator configured for performing a mixed radix conversion absent of unwanted statistical artifacts.

2. Description of the Related Art

Many number theoretic based computational systems include ring generators. A ring generator is a simple structure over a finite field that exhaustively produces possible outputs through repeated mapping. The mapping is some combination of an additive and a multiplicative mapping, with irreducible polynomials being ideal. For example, a ring generator includes repeated computations of an irreducible polynomial $f(x)=3x^3+3x^2+x$ on the finite Galois field, $GF[11]$. A finite or Galois field $GF[M]$ is a field that contains only a finite number of elements $\{0, 1, 2, \ldots, M-1\}$. The finite or Galois field $GF[M]$ has a finite field size defined by the Galois characteristic M. M is most often chosen to be either a power of two (2) or an odd prime.

Despite the advantages of such a ring generator, it suffers from certain drawbacks. For example, the odd-sized ring generator's reliance on the Galois characteristic M is computationally inefficient in a digital (binary) domain. Also, lookup table operations performed in the finite or Galois field $GF[M]$ are resource intensive. Moreover, the ring generator's orbits are highly deterministic. As such, knowledge of a mapping and current finite field conditions gives complete knowledge of an output sequence and in many applications it is desirable to mask this information. Such applications include, but are not limited to, a cryptographic application.

In view of the forgoing, there remains a need for a ring generator implementing an arithmetic operation that is computationally efficient in a digital (binary) domain. There is also a need for a ring generator having an implementation that is less hardware intensive than conventional ring generator implementations. There is further a need for a ring generator having orbits that are more robust in obscuring their deterministic characteristics for use in a cryptographic system.

SUMMARY OF THE INVENTION

The invention concerns a cryptographic system. The cryptographic system is comprised of a data stream receiving means, a generator, a mixed radix converter and an encryptor. The data stream receiving means is configured to receive an input data stream. The generator is configured to selectively generate a random number sequence utilizing a ring structure which has been punctured. The mixed radix converter is coupled to the generator and configured to perform a mixed radix conversion. The mixed radix conversion is performed to convert the random number sequence from a first number base to a second number base. The ring structure which has been punctured and the mixed radix converter are configured in combination to produce a random number sequence in the second number base which is exclusive of any statistical artifacts associated with the mixed radix conversion. The encryptor is coupled to the data stream receiving means and the mixed radix converter. The encryptor is configured to generate a modified data stream by incorporating or combining the random number sequence in the second number base with the input data stream.

According to an aspect of the invention, the first number base is defined by a first Galois field characteristic or a compilation of Galois fields of mutually prime characteristic combined via a method similar to the Chinese Remainder Theorem. Similarly, the second number base is defined by a second Galois field characteristic or a compilation of Galois fields of mutually prime characteristic combined via a method similar to the Chinese Remainder Theorem. The first Galois field characteristic is mutually prime with respect to the second Galois field characteristic. The second Galois field characteristic is selected to be a finite field size which is smaller than a finite field size of a first Galois field.

According to another aspect of the invention, the ring structure has n element(s) removed therefrom to eliminate at least one statistical artifact in the random number sequence expressed in the second number base. n is determined based on a mathematical relation between a number of elements in the first Galois field and the number of elements in a second Galois field. More particularly, n is determined based on a remainder value resulting from a quotient of the number of elements in the first Galois field divided by the number of elements in the second Galois field.

According to another aspect of the invention, the mixed radix conversion produces a plurality of equivalence classes in the second number base. The n elements which are removed from the ring structure are selected to ensure that each equivalence class has an equal number of elements after the mixed radix conversion.

According to another aspect of the invention, the ring structure has m element(s) removed therefrom to induce a chosen non-uniform statistical artifact when expressed in a second number base. M is determined based on the characteristics of the two number bases and the mechanics of a combining method. The specific value of M is application dependent.

According to another aspect of the invention, the encryptor includes at least one of a multiplier, an adder, a digital logic device and a feedback mechanism. In this regard, it should be appreciated that the encryptor is configured to perform a combination method for masking the input data stream. The combination method includes at least one of a standard multiplication operation, a multiplication in a Galois extension field operation, an addition modulo q operation, a subtraction modulo q operation and a bitwise logic operation.

According to another aspect of the invention, the cryptographic system is further comprised of a truncation device and/or a size converter. The truncation device is coupled to the mixed radix converter. The truncation device is configured to select a truncated portion of the random number sequence in the second number base. The size converter is coupled between the truncation device and the encryptor. The size converter is configured to convert the truncated portion from a size $GF[M]$ to a size n if the input data stream is of a size $GF[n]$ or $GF[n/d]$, where d is an even divisor of n. The input data stream is expressed in the second number base.

According to yet another aspect of the invention, the cryptographic system is comprised of a modified data stream receiving means. The modified data receiving means is configured to receive the modified data stream. The cryptographic system is also comprised of a second ring structure and a second mixed radix converter. The second ring structure and a second mixed radix converter are configured in combination to produce a decryption sequence. The cryptographic system is further comprised of a decryptor. The decryptor is electronically connected to the modified data stream receiving means and the second mixed radix converter. The decryptor is configured to generate decrypted data by performing a decryption method utilizing the modified data stream and decryption sequence.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

Figure 1:
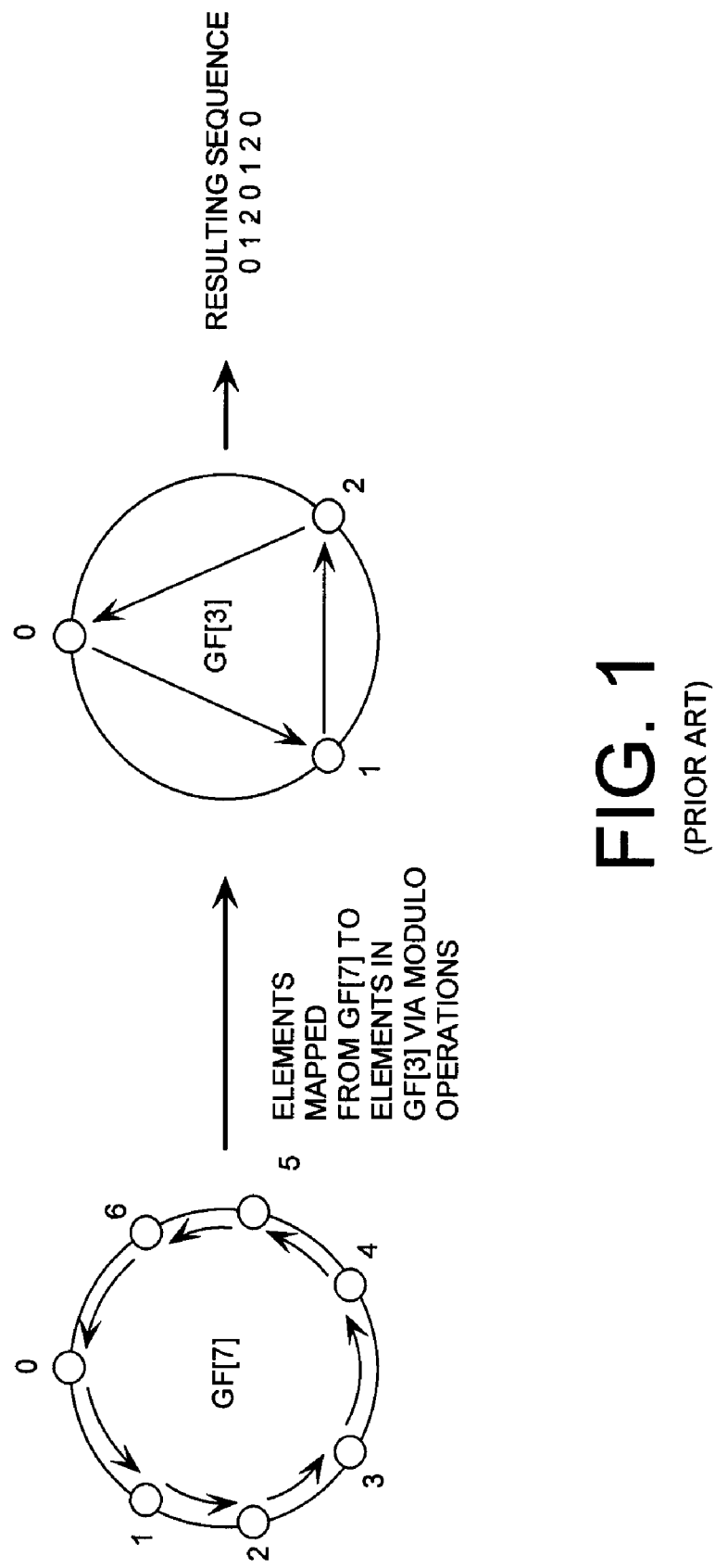
FIG. 1 is a conceptual diagram of a conventional mixed radix conversion algorithm that is useful for understanding the invention.

Referring now to FIG. 1, there is provided a conceptual diagram of a conventional mixed radix conversion algorithm that is useful for understanding the invention. The phrase "mixed radix conversion" as used herein refers to a conversion of a value or number sequence from a first number base (or radix) to a second number base (or radix). For example, a number sequence expressed in a Galois field GF[7] base is converted to a number sequence expressed in a Galois field GF[3] base.

In cryptographic systems, various algorithms are employed for combining a number sequence with a data stream. This combining process can be performed for encrypting or masking the data stream prior to its transmission over a communications link. Such algorithms can include residue number system (RNS) operations for expressing each number of the number sequence in a Galois field [p] base. A Galois field GF[p] is a field that contains only a finite number of elements $\{0, 1, 2, \ldots, p-1\}$. As such, all arithmetic operations performed in the finite or Galois field result in an element within that field. The finite or Galois field GF[p] has a finite field size defined by the Galois characteristic p. As such, a resulting sequence of a cyclic Galois field GF[p] operation must repeat every $p^{th}$ element. These RNS operations are well known to persons skilled in the art, and therefore will not be described in great detail herein.

Notably, there is a statistical non-uniformity in an element distribution resulting from a number sequence conversion from a first Galois field $GF[p_1^{k1}]$ base to a second Galois field $GF[p_2^{k2}]$ base when the two (2) number bases are not evenly divisible. For example, a number sequence expressed in a Galois field GF[7] base is mapped to a number sequence expressed in a Galois field GF[3] base. The random number sequence expressed in a Galois field GF[7] base is defined by the set of elements $\{0, 1, 2, \ldots, 6\}$. Similarly, the number sequence expressed in a Galois field GF[3] base is defined by the set of elements $\{0, 1, 2\}$. Mapping the number sequence expressed in a Galois field GF[7] base to a number sequence expressed in the Galois field GF[3] base generally involves segmenting each element $\{0, 1, 2, \ldots, 6\}$ by their corresponding equivalence class modulo three (3). Since the Galois field GF[3] is a finite field that contains only a finite number of elements $\{0, 1, 2\}$, there is a corresponding equivalence class for the integers zero (0), one (1), and two (2).

The mapping operations of the elements from the Galois field GF[7] to elements in a Galois field GF[3] are listed in the following Table (1).

TABLE 1

| Elements From A Galois Field GF[7]: | Mapping Operations: | Equivalent Elements In A Galois Field GF[3]: |
|---|---|---|
| 0 | 0 modulo 3 | 0 |
| 1 | 1 modulo 3 | 1 |
| 2 | 2 modulo 3 | 2 |
| 3 | 3 modulo 3 | 0 |
| 4 | 4 modulo 3 | 1 |
| 5 | 5 modulo 3 | 2 |
| 6 | 6 modulo 3 | 0 |

As illustrated in Table 1, the mapping operations result in a non-uniform distribution of the elements over the Galois field GF[3]. Specifically, the resulting sequence of the mapping operations is defined as $\{0\ 1\ 2\ 0\ 1\ 2\ 0\}$. There are three elements $\{0, 3, 6\}$ from the Galois field GF[7] in an equivalence class for the integer zero (0). There are two (2) elements $\{1, 4\}$ from the Galois field GF[7] in an equivalence class for the integer one (1). There are two (2) elements $\{2, 5\}$ from the Galois field GF[7] in an equivalence class for the integer two (2). The non-uniformity is apparent since different equivalence classes contain different numbers of elements.

By utilizing a statistical analysis, an attacker of a cryptographic system implementing the conventional mixed radix conversion algorithm (described above in relation to FIG. 1) can more easily identify an original number sequence from a data stream altered by a resulting number sequence of the mapping operations. For example, if one knows the sizes of the two (2) number bases, then the attacker can use the statistical proportion of elements in the various equivalence classes to identify the original number sequence from the altered data stream. As such, it is desirable to remove statistical artifacts from results derived by a mixed radix conversion algorithm so that identifying an original number sequence from an altered data stream is more difficult.

Accordingly, some embodiments of the present invention provide a method for removing unwanted statistical artifacts in a mixed radix conversion. This method generally includes puncturing a Galois field $GF[2^k]$. As used herein, the term "puncturing" means discarding one or more elements in a Galois field $GF[2^k]$ that exceed an integer multiple of a desired range characteristic. The "puncturing" is performed to maintain a perfectly uniform distribution over a desired number base. Alternatively, the puncturing is performed to induce specific non-uniformities in the statistical output distribution. The desired number base includes, but is not limited to, prime number bases that are smaller than the Galois field $GF[2^k]$ base. The Galois field $GF[2^k]$ base is preferably mutually prime with respect to the desired number base. The phrase "mutually prime" as used herein refers to two or more integers having no common divisor except one (1). This method can be used in a variety of applications. For example, such a method can be implemented in a cryptographic system. In such a scenario, the method can be used to increase a security feature of a cryptographic system. All arithmetic of the initial sequence generation process is performed in the first number base prior to puncturing, The present invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

Figure 2:
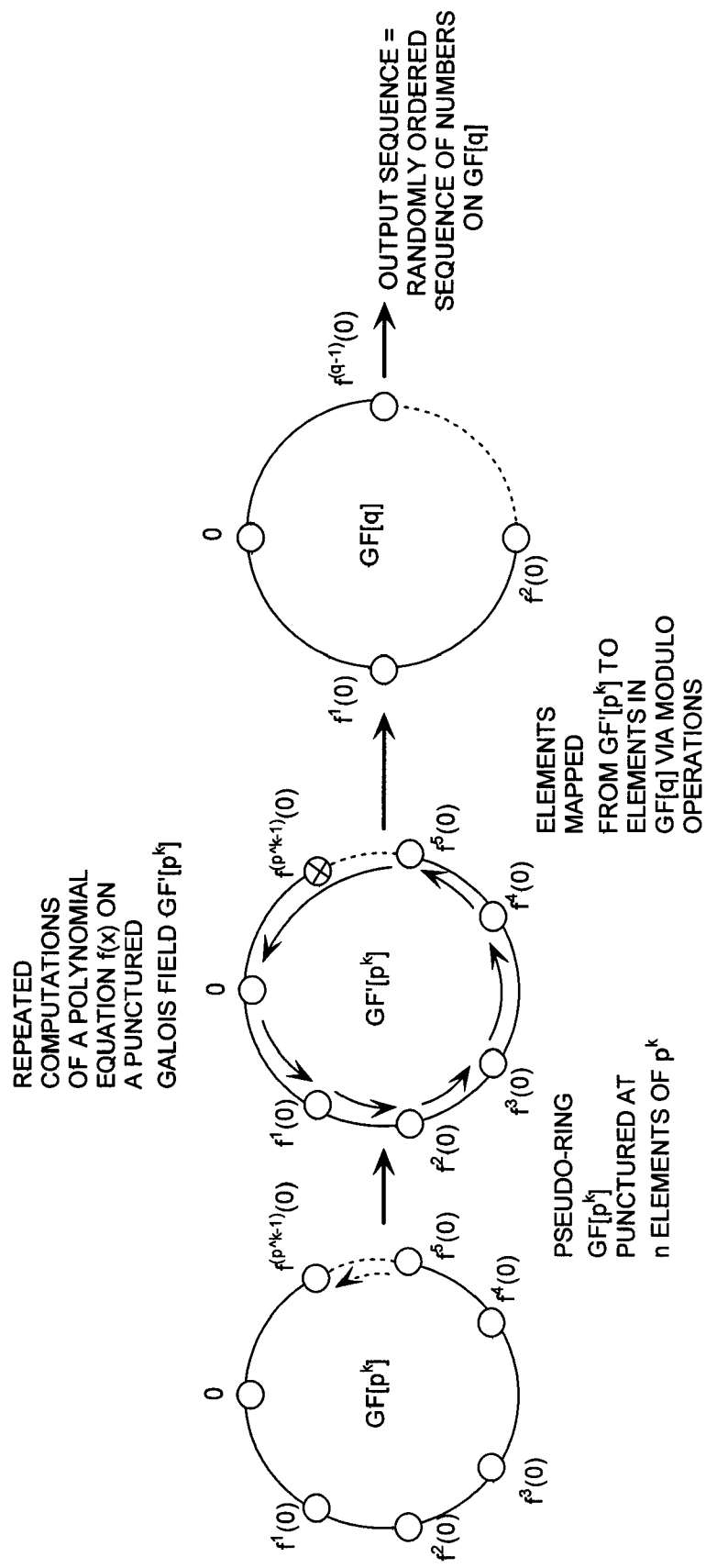
FIG. 2 is a conceptual diagram of a method for removing unwanted statistical artifacts in a mixed radix conversion algorithm that is useful for understanding the invention.

Referring now to FIG. 2, there is provided a conceptual diagram of a method for removing unwanted statistical artifacts in a mixed radix conversion that is useful for understanding the invention. The mixed radix conversion begins with a structure defined by a Galois field $GF[p^k]$, where $p^k$ is a number defining a finite field size of the Galois field $GF[p^k]$. According to an embodiment of the invention, p is advantageously selected to have a value other than two (2). Still, the invention is not limited in this regard. As should be understood, the Galois field $GF[p^k]$ is a field that contains only a finite number of elements $\{0, 1, 2, \ldots, p^k-1\}$. In order to guarantee a mapping having a uniform distribution over a Galois field $GF[q]$, at least one element of the Galois field $GF[p^k]$ is discarded. In other words, the Galois field $GF[p^k]$ is punctured at one or more elements so as to have a mapping defined by an integer number of complete cycles in a Galois field $GF[q]$. The elements discarded need not be contiguous or chosen in any specific order besides their resulting equivalence class in the second Galois field, $GF[q]$. Moreover, a larger number of elements than the minimum necessary to remove statistical artifacts may be removed in order to more completely mask the attributes of the conversion.

In this regard, it should be appreciated that the number of cycles in the Galois field $GF[q]$ can be defined by a mathematical Equation (1).

$$NOC = (p^k - n)/q \quad (1)$$

where NOC is the number of cycles in a punctured Galois field $GF[p^k-n]$. $p^k-n$ is a positive integer defining a finite field size of a punctured Galois field $GF[p^k-n]$. q is a positive integer defining a finite field size of a Galois field $GF[q]$.

By substituting the values for $p^k$, n, and q into the mathematical Equation (1), the NOC for the Galois field $GF[q]$ can be computed. For example, if $p^k$ equals twenty-seven (27), q equals five (5), and the number of punctures n is seven (7), then the NOC for the Galois field $GF[5]$ equals four (4). In accordance with the embodiment shown in FIG. 2, the Galois field $GF[3^3]$ (or Galois field $GF[27]$) could be punctured at elements $\{1, 5, 9, 17, 18, 20, 26\}$. Alternatively, the same Galois field $GF[27]$ ring could be punctured at elements $\{0, 1, 2, 3, 4, 5, 6\}$. Still, the invention is not limited in this regard.

The mixed radix conversion continues with repeated computations of a polynomial equation f(x) modulo $p^k$ on a punctured Galois field $GF'[p^k]$, which contains $p^k-n$ elements. The results of the computations are numbers expressed in a number base defined by the punctured Galois field $GF'[p^k]$ modulo the second number base q. For example, if the punctured Galois field $GF'[p^k]$ is selected as a Galois field $GF[10]$ punctured at element nine (9), then the resulting sequence can have a size $GF'[10]$ (which is isomorphic to $GF[9]$). As such, the resulting sequence is defined by the elements $\{0, 1, 2, \ldots, 8\}$. The elements of this resulting sequence are mapped to elements in a Galois field $GF[q]$.

The following Examples are provided in order to further illustrate the present invention. The scope of the present invention, however, is not to be considered limited in any way thereby.

EXAMPLE 1

Figure 3:
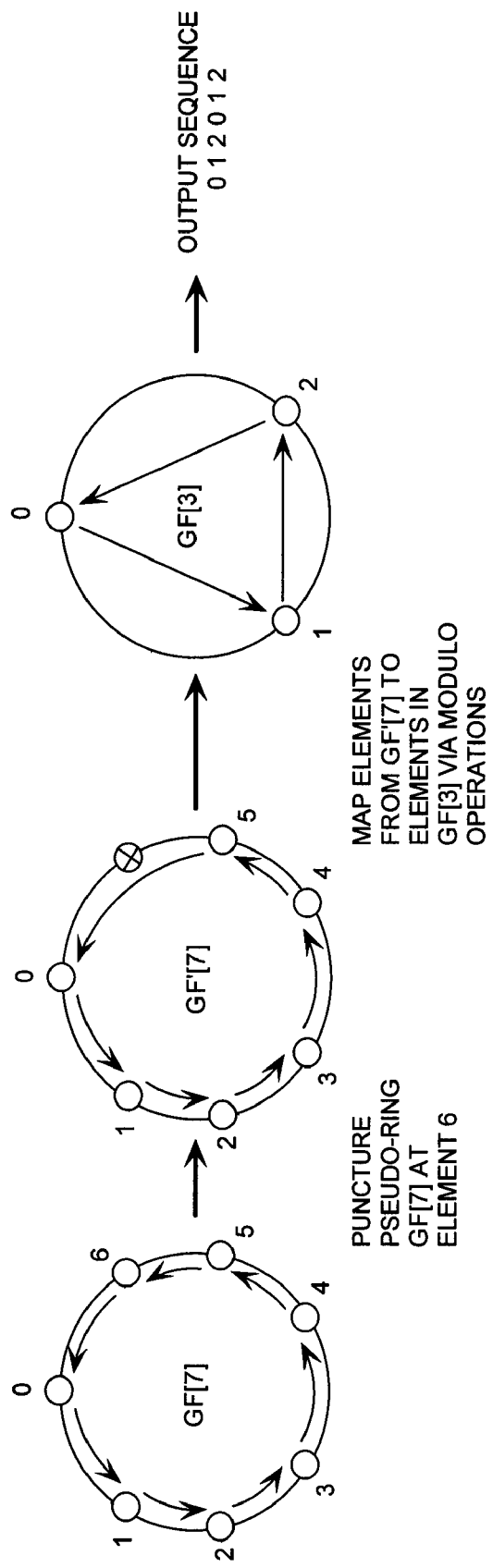
FIG. 3 is a schematic illustration of a mixed radix conversion of elements from a Galois field GF[7] to a Galois field GF[3] that is useful for understanding the invention.

Referring now to FIG. 3, a ring generator is selected to include repeated computations of the trivial polynomial equation f(x)=x on a Galois field $GF[7]$. The Galois field $GF[7]$ is a field that contains only a finite number of elements $\{0, 1, 2, \ldots, 6\}$. The elements of the Galois field $GF[7]$ are mapped to elements in a Galois field $GF[3]$. In order to guarantee a uniform distribution over a structure defined by the Galois field $GF[3]$, the element of the Galois field $GF[7]$ having a value of six (6) is discarded. In other words, the Galois field GF(7) is punctured at element six (6) so as to have a mapping defined by two (i.e., 6/3=2) complete cycles in the Galois field $GF[3]$. It should be noted that an equivalent puncturing operation could be obtained by choosing to puncture $GF[7]$ at element zero (0) or element three (3) instead of element six (6).

In this regard, it should be appreciated that the number of cycles in the Galois field $GF[3]$ is defined by the previously discussed mathematical Equation (1), repeated below.

$$NOC = (p^k - n)/q$$

where NOC is the number of cycles in the Galois field $GF[3]$. Values for the variables are p=7, k=1, n=1, and q=3.

The mappings of the elements in the punctured Galois field $GF'[7]$ to elements in a Galois field $GF[3]$ are listed in the following Table (2).

TABLE 2

| Elements From A Punctured Galois Field GF'[7]: | Mapping Operations: | Elements In A Galois Field GF[3]: |
| --- | --- | --- |
| 0 | 0 modulo 3 | 0 |
| 1 | 1 modulo 3 | 1 |
| 2 | 2 modulo 3 | 2 |
| 3 | 3 modulo 3 | 0 |
| 4 | 4 modulo 3 | 1 |
| 5 | 5 modulo 3 | 2 |

As illustrated in Table 3, the mapping operations result in a uniform distribution of the elements over the Galois field $GF[3]$. Specifically, the resulting sequence of the mapping operations is defined as $\{0\ 1\ 2\ 0\ 1\ 2\}$. There are two elements $\{0, 3\}$ from the Galois field GF [7] in an equivalence class for the integer zero (0). There are two (2) elements $\{1, 4\}$ from the Galois field $GF[7]$ in an equivalence class for the integer one (1). There are two (2) elements $\{2, 5\}$ from the Galois field $GF[7]$ in an equivalence class for the integer two (2).

EXAMPLE 2

A ring generator is selected to include repeated computations of a polynomial equation f(x) on a Galois field $GF[233]$. The Galois field $GF[233]$ is a field that contains only a finite number of elements $\{0, 1, 2, \ldots, 232\}$. The elements of the Galois field GF[233] are mapped to elements in a Galois field GF[5]. In order to guarantee a uniform distribution over a Galois field GF[5], thirteen (13) elements of the Galois field GF[233] are discarded. Chosen arbitrarily, the last thirteen (13) elements are discarded via puncturing. In other words, the Galois field GF[233] is punctured at element two hundred twenty (220) through element two hundred thirty two (232) so as to have a mapping defined by forty-four (i.e., 220/5=44) complete cycles in a Galois field GF[5].

In this regard, it should be appreciated that the number of cycles in the Galois field GF[5] is defined by a mathematical Equation (2).

$$NOC = p_1/p_2 \qquad (2)$$

where NOC is the number of cycles in the Galois field GF[5]. $p_1$ is a positive integer number defining a finite field size of a first punctured Galois field GF[233]. $p_2$ is a positive integer number defining a finite field size of a second Galois field GF[5].

By substituting the values for $p^k$, n, and q into the mathematical Equation (1), the NOC for the Galois field GF[5] can be computed as follows: $NOC = (233^1 - 13)/5 = 44$. Accordingly, there are forty four (44) complete cycles through the Galois field GF[5].

The mappings of the elements of the punctured Galois field GF'[233] to elements in a Galois field GF[5] are listed in the following Table (3).

TABLE 3

| Elements From A Punctured Galois Field GF'[233]: | Mapping Operations: | Elements In A Galois Field GF[5]: |
|---|---|---|
| 0 | 0 modulo 5 | 0 |
| 1 | 1 modulo 5 | 1 |
| 2 | 2 modulo 5 | 2 |
| 3 | 3 modulo 5 | 3 |
| 4 | 4 modulo 5 | 4 |
| 5 | 5 modulo 5 | 0 |
| ... | | |
| 215 | 215 modulo 5 | 0 |
| 216 | 216 modulo 5 | 1 |
| 217 | 217 modulo 5 | 2 |
| 218 | 218 modulo 5 | 3 |
| 219 | 219 modulo 5 | 4 |

As illustrated in Table 3, the mapping operations result in a uniform distribution of the elements over the Galois field GF[5]. Specifically, the resulting sequence of the mapping operations is defined as {0 1 2 3 4 ... 0 1 2 3 4}. There are the same number of elements from the Galois field GF[5] in each of the equivalence classes for the integers zero (0), one (1), two (2), three (3), and four (4).

Figure 4:
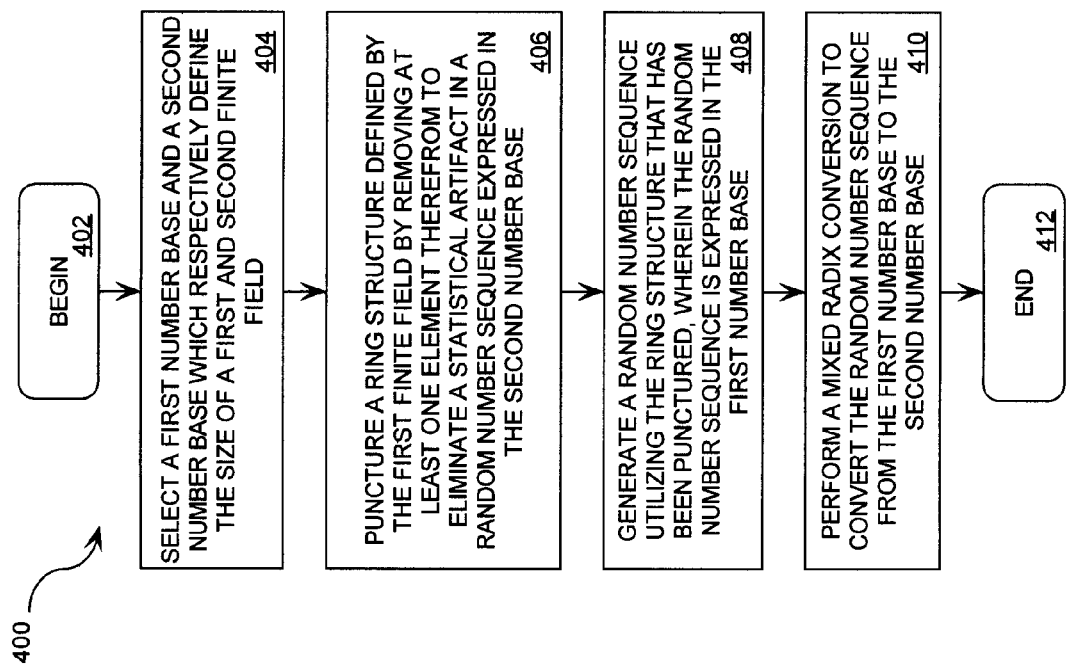
FIG. 4 is a flow diagram of a method for masking a process used in generating a random number sequence that is useful for understanding the invention.

Referring now to FIG. 4, there is provided a flow diagram of a method 400 for masking a process used in generating a random number sequence. As shown in FIG. 4, the method 400 begins with step 402 and continues with step 404. In step 404, a first number base and second number base are selected. The first number base defines a size of a first finite field. The first finite field can be defined by a first Galois field GF[$p^k$] or a first Galois field GF[M]. The second number base defines a size of a second finite field. The second finite field can be defined by a second Galois field GF[q]. The first Galois field can be selected so that it is mutually prime with respect to the second Galois field. The second Galois field can be selected so that it has a finite field size smaller than a finite field size of the first Galois field.

After step 404, the method 400 continues with step 406. In step 406, a ring structure is punctured by removing at least one element therefrom. The ring structure is defined by the first finite field or a first Galois field. This puncturing is performed to eliminate or intentionally induce a statistical artifact in a random number sequence expressed in the second number base. The statistical artifact can include a statistical artifact of a mixed radix conversion (described below in relation to step 410). This step can further involve removing n elements from the ring structure. n is determined based on a mathematical relation between a number of elements in the first finite field or Galois field and a number of elements in the second finite field or Galois field. More particularly, n is determined based on a remainder value resulting from a quotient of the number of elements in the first finite field or Galois field GF divided by the number of elements in the second finite field or Galois field.

Subsequently, step 408 is performed where a random number sequence is generated. This step can involve selectively generating the random number sequence utilizing the ring structure which has been punctured. It should be appreciated that the random number sequence generated in this step is computed and expressed in the first number base. In step 410, a mixed radix conversion is performed to convert the random number sequence from the first number base to the second number base. It should be understood that the mixed radix conversion produces a plurality of equivalent classes in the second number base. The n elements which are removed from the ring structure are selected to ensure that each equivalence class has a chosen number of elements after performing this step. Thereafter, step 412 is performed where the method 400 ends.

A person skilled in the art will appreciate that method 400 is one method for masking a process used in generating a random number sequence. However, the invention is not limited in this regard and any other method for masking a process used in generating a random number sequence can be used without limitation.

Method for Altering A Data Stream

Figure 5:
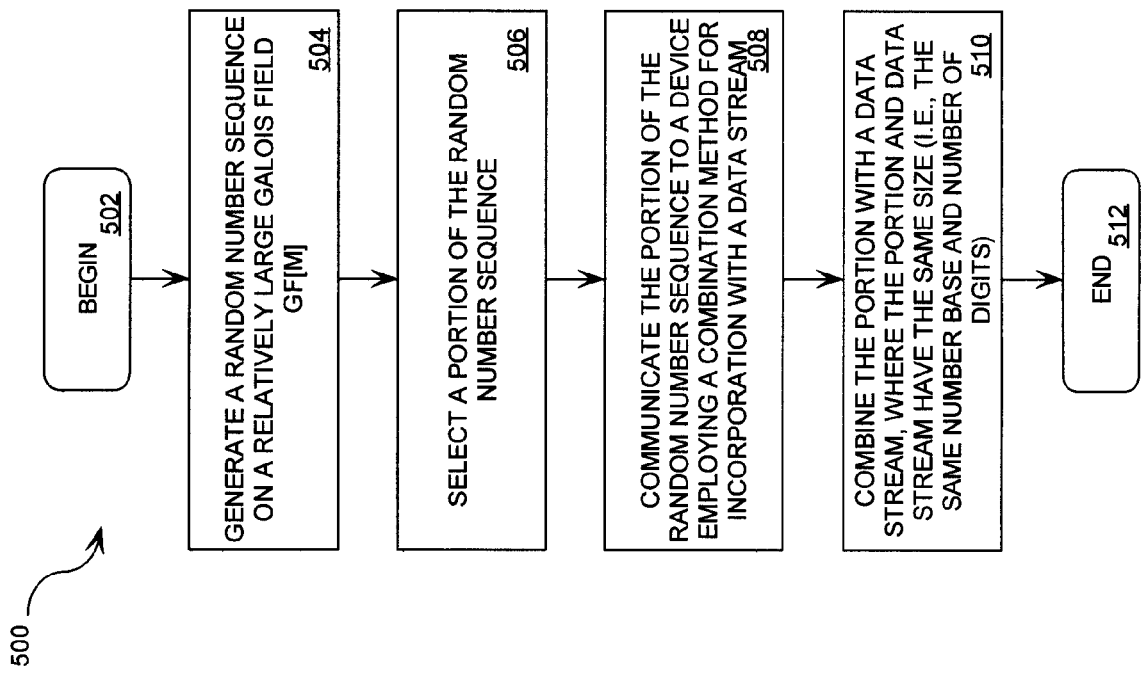
FIG. 5 a flow diagram of a conventional method for altering a data stream that is useful for understanding the invention.

Referring now to FIG. 5, there is provided a flow diagram of a conventional method 500 for altering a data stream that is useful for understanding the invention. As shown in FIG. 5, the method 500 begins with step 502 and continues with step 504. In step 504, a random number sequence is generated. It should be understood that the sequence of random numbers are contained within a relatively large Galois field GF[M]. After generating the random number sequence, step 506 is performed where a portion of the random number sequence is selected.

After step 506, the method 500 continues with step 508. In step 508, the portion of the random number sequence is communicated to a device employing a combination method. Such devices include a multiplier, an adder, a digital logic device, a feedback mechanism, or similar combining function device. Thereafter, the portion of the random number sequence is incorporated or combined with a data stream thereby altering the data stream. In this regard, it should be understood that the portion of the random number sequence and data stream have the same size, i.e., they are expressed in the same number base (or radix) and contain the same number of digits. As such, the method 500 can be modified accordingly. For example, the method 500 can include a conversion step prior to the step 508. The conversion step can involve converting the portion of the random number sequence from a size GF[M] to a size n if the data stream is of a size GF[n] or GF[n/d], where d is an even divisor of n. Subsequently, step 512 is performed where the method 500 ends.

As should be understood, a relatively large Galois field GF[M] provides a certain degree of security to the conventional method 500. In this regard, it should be appreciated that the Galois field GF[M] is a field that contains only a finite number of elements {0, 1, 2, . . . , M−1}. As such, an output sequence can repeat every $M^{th}$ element. This repetitive behavior can produce correlations thereby making a decoding of an altered data stream relatively easy when M is small. Consequently, it is desirable to select a relatively large Galois field GF[M].

It should also be appreciated that selecting a truncated portion of the random number sequence also provides a certain degree of security to the conventional method 500. For example, a random number sequence is generated on a Galois field GF[M], where M is a large multiplicative compilation of mutually prime numbers. If the random number sequence contains five hundred (500) independent p-adic digits and a portion of the random number sequence is selected to include only sixteen (16) of the five hundred (500) digits to alter a data stream, then it becomes more difficult to determine the deterministic rule employed for generating the random number sequence. Still, it is desirable to further increase the security of the method.

Figure 6:
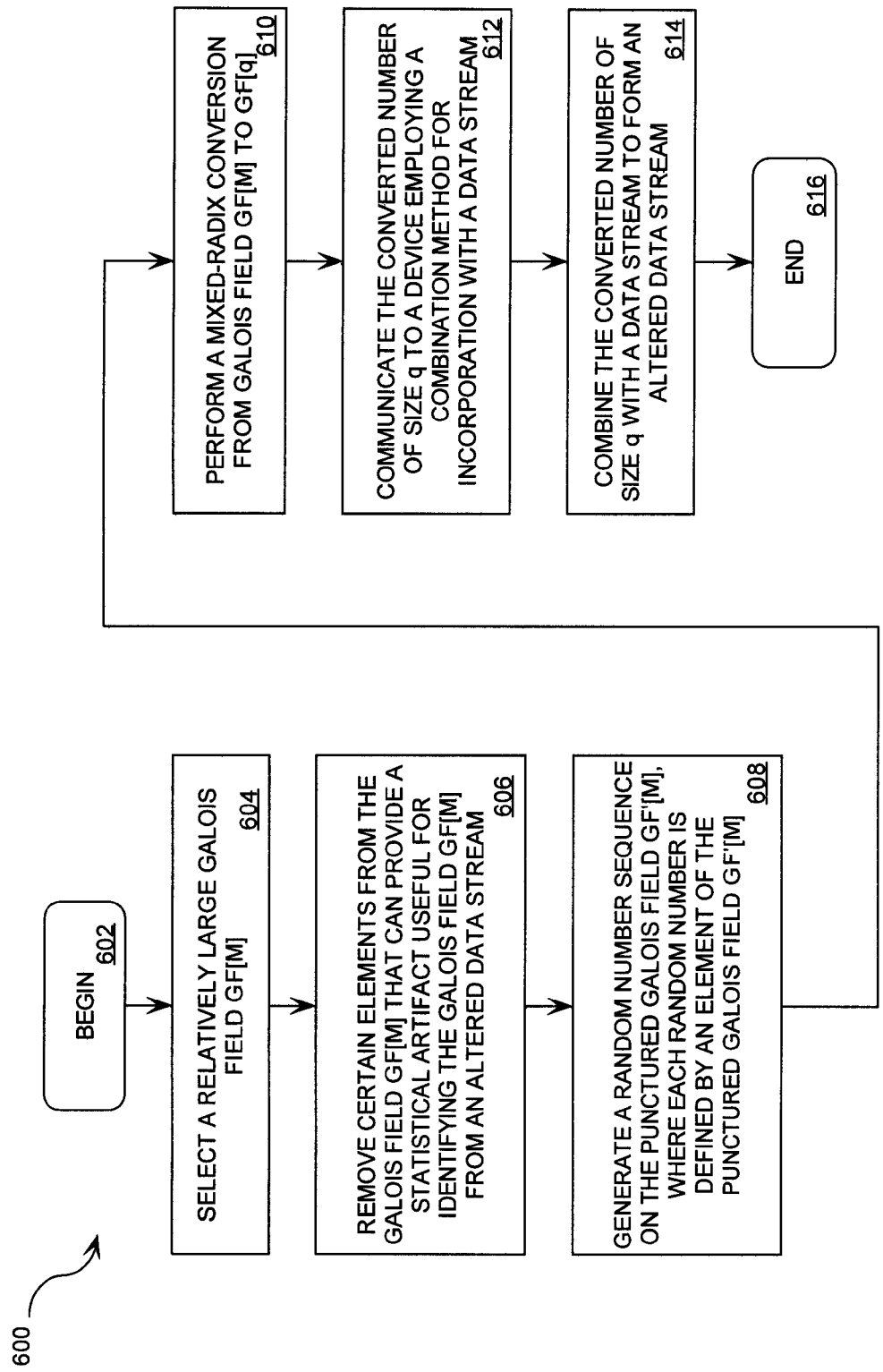
FIG. 6 a flow diagram of a method for increasing the security of cryptographic system that is useful for understanding the invention.

Referring now to FIG. 6, there is provided a method 600 for increasing the security of a cryptographic system that is useful for understanding the invention. As shown in FIG. 6, the method 600 begins with step 602 and continues with step 604. In step 604, a relatively large Galois field GF[M] is selected. As should be understood, a large Galois field can minimize the likelihood that an attacker of a cryptographic system can determine the Galois field GF[M] employed for generating an original random number sequence from an altered data stream. In effect, the large Galois field GF[M] can provide a certain degree of security to a cryptographic system implementing method 600.

Thereafter, step 606 is performed where certain elements are removed from the Galois field GF[M]. The elements are selected as elements that can provide a statistical artifact useful for identifying the Galois field GF[M] from an altered data stream. For example, the elements are selected so that a mixed radix conversion of the same is defined by a set of complete cycles in a Galois field GF[q]. As a result, this step assures that a subsequent mixed radix conversion will be absent of unwanted statistical artifacts. In effect, this step provides an increased degree of security to a cryptographic system implementing method 600 by making the deterministic rule defining the output sequence dependant on a non-advertised mutually prime number base.

Subsequently, the method 600 continues with step 608. In step 608, a random number sequence is generated on the punctured Galois field GF'[M]. Each random number of the sequence is defined by an element of the punctured Galois field GF'[M].

In step 610, a mixed-radix conversion is performed from a Galois field GF[M] to a Galois field GF[q]. This step involves selecting a portion of the random number sequence. This step also involves converting the selected portion of the random number sequence from a punctured Galois field GF'[M] to the resulting output number base represented by the Galois field GF[q]. This step provides an even higher degree of security to a cryptographic system implementing method 600. In this regard, it should be appreciated that it becomes more difficult to determine the Galois field GF[M] and the underlying random number sequence when a mixed-radix conversion is used prior to altering a data stream.

After step 610, step 612 is performed where the resulting value from step 610 mapped on the Galois field GF[q] is communicated to a device employing a combination method for masking a data stream. The combination method may be standard multiplication, multiplication in a Galois extension field, addition modulo q, subtraction modulo q, bitwise logic operations, or any other standard combination method. In this regard, it should be understood that the Galois field GF[q] output and input data stream need not have the same size if proper combination techniques are used. In step 614, the resulting value from step 610 is combined with a data stream to form an altered data stream. Thereafter, step 616 is performed where the method 600 ends.

A person skilled in the art will appreciate that method 600 is one method for increasing a security of a cryptographic system. However, the invention is not limited in this regard and any other method implementing the present invention can be used without limitation.

Hardware Implementation

Figure 7:
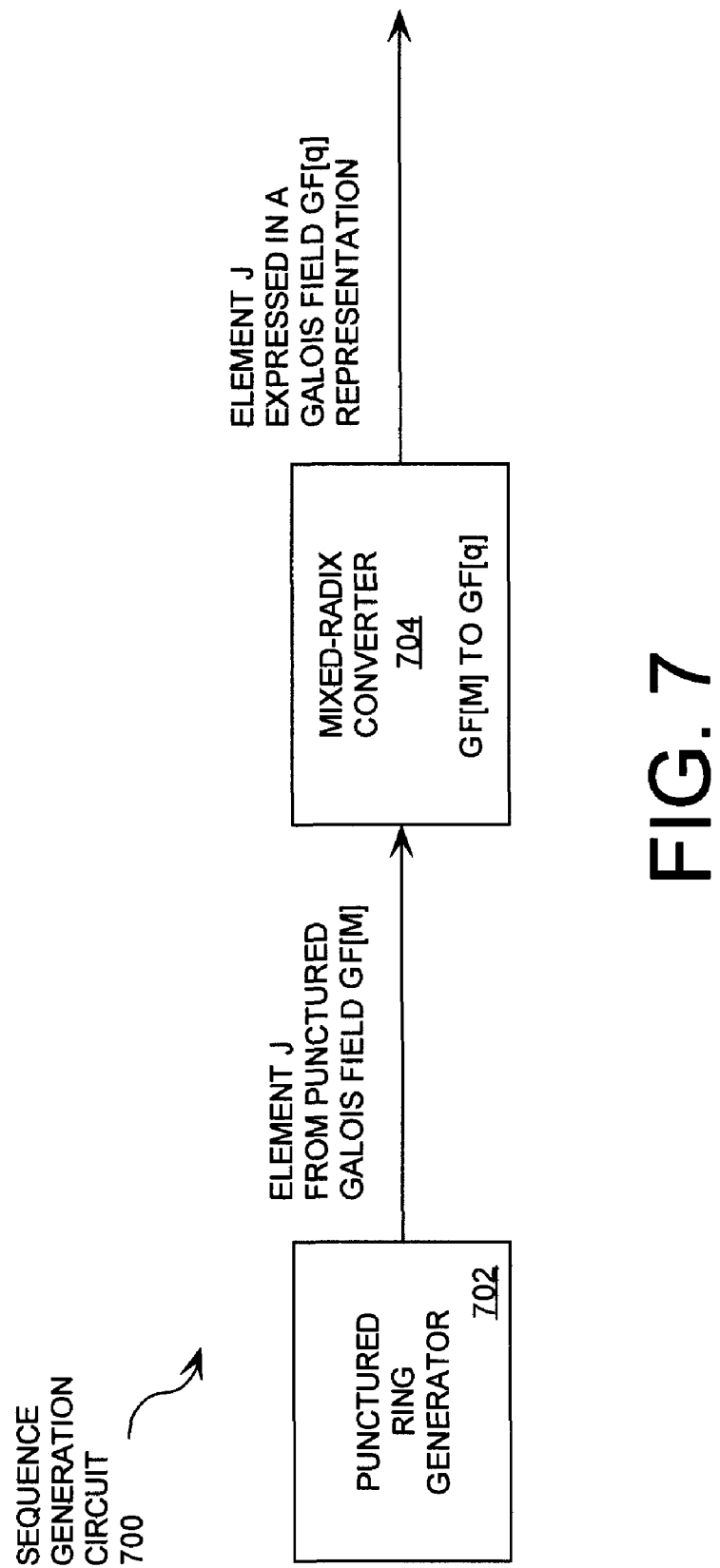
FIG. 7 is a block diagram of a sequence generation circuit having a punctured ring generator that is useful for understanding the invention.

Referring now to FIG. 7, there is provided a sequence generation circuit (SGC) 700 that is useful for understanding the invention. As shown in FIG. 7, the SGC 700 is comprised of a punctured ring generator 702 and a mixed radix converter 704. It should be understood that the punctured ring generator 702 and the mixed radix converter 704 are configured in combination to produce a random number sequence in a second number base which is exclusive of any undesired statistical artifacts associated with a mixed radix conversion.

As shown in FIG. 7, the punctured ring generator 702 is comprised of hardware and software configured to generate a random number sequence expressed in a first number base. The punctured ring generator 702 is also comprised of hardware and software configured to selectively generate the random number sequence utilizing a ring structure which has been punctured. The ring structure can be a punctured Galois field GF'[M]. Each of the random numbers can each be defined by or as an element from the punctured Galois field GF'[M]. The ring structure has at least one element removed therefrom to eliminate a statistical artifact in a random number expressed in a second number base. The punctured ring generator 702 is further comprised of hardware and software configured to communicate random numbers to the mixed radix converter 704.

The mixed radix converter 704 is comprised of hardware and software configured to perform mixed radix conversion. The mixed radix conversion involves performing arithmetic operations to convert a random number J from a first number base to a second number base. According to an aspect of the invention, the first number base is defined by a first Galois field GF[M]. Similarly, the second number base is defined by a second Galois field GF[q]. The first Galois field GF[M] can be mutually prime with respect to the second Galois field GF[q]. The second Galois field GF[q] has a finite field size smaller than the finite field size of the first Galois field GF[M].

The arithmetic operations can involve performing modulo operations. Modulo operations are well known to those skilled in the art, and therefore will not be described in great detail herein. However, it should be appreciated that modulo operations can generally be defined by a mathematical Equation (2).

$$R = J \, \text{modulo}(q) \qquad (2)$$

where R is a remainder derived from a modulo operation. J is a random number input to the mixed radix converter 704. q is a modulus having a value selected to be a positive integer defining a finite field size of a Galois field GF[q]. It should be noted that the range of values for J are {0, 1, 2, . . . , M} and the range of values for R are {0, 1, 2, . . . , q−1}.

The mapping operations can also involve lookup table operations. In such a scenario, the mixed radix converter 704 can query a data store (not shown) for information necessary to map a random number J modulo q. The mixed radix converter 704 is also comprised of hardware and software configured to communicate a random number J expressed in a Galois field GF[q] base to an external device (not shown).

According to an aspect of the invention, the ring structure has n elements removed therefrom. By removing the n elements from the ring structure, at least one statistical artifact is eliminated or intentionally induced in the random number sequence expressed in the second number base. It should be understood that n is determined based on a mathematical relation between a number of elements in the first Galois field and a number of elements in a second Galois field.

According to another aspect of the invention, the mixed radix conversion produces a plurality of equivalence classes in the second number base. The n elements which are removed from the ring structure are selected to ensure that each equivalence class has the desired number of elements after the mixed radix conversion.

Figure 8:
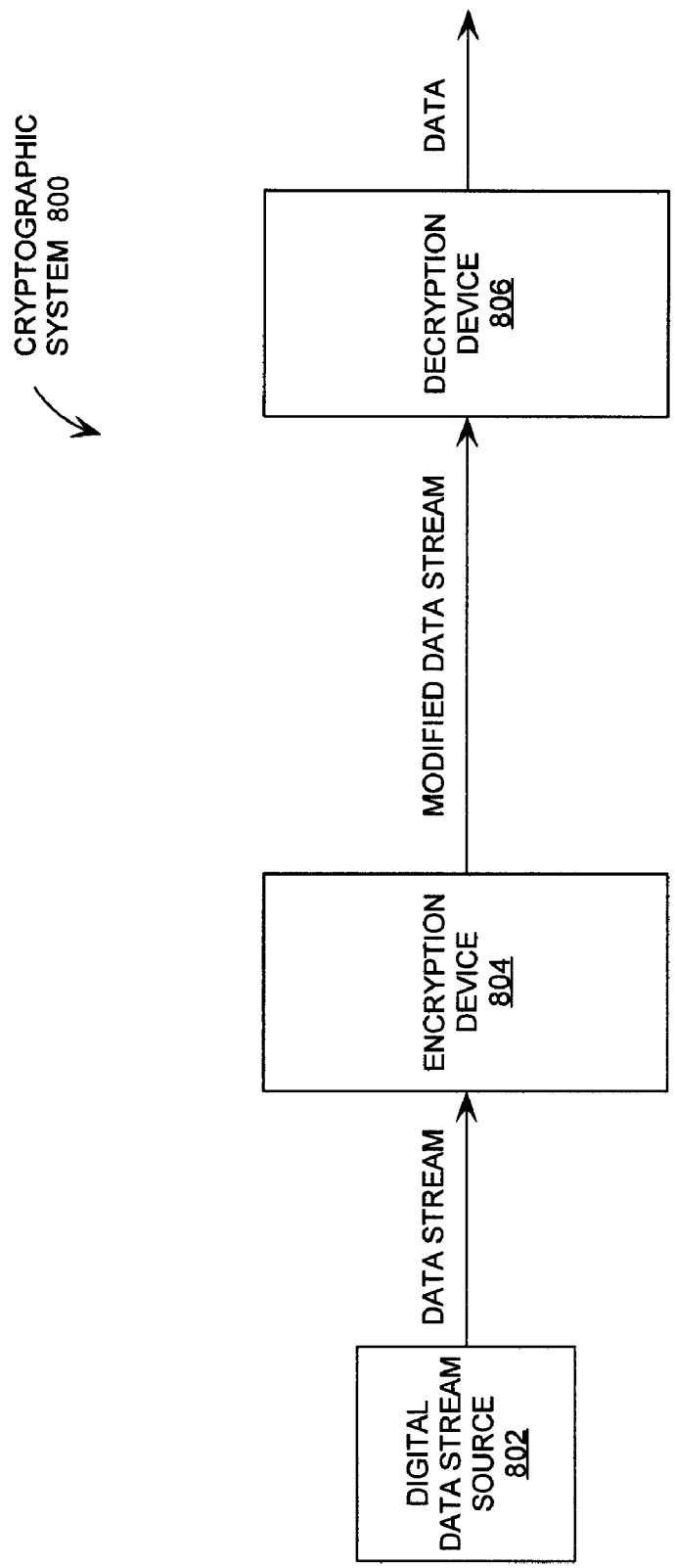
FIG. 8 is a block diagram of a cryptographic system that is useful for understanding the invention.

Referring now to FIG. 8, there is illustrated one embodiment of a cryptographic system 800 which could be used to implement the inventive arrangements. Notably, the cryptographic system 800 has an increased security feature as compared to conventional cryptographic systems. In this regard, it should be understood that the cryptographic system 800 includes a means to encrypt a data stream utilizing a random number sequence which is exclusive of any statistical artifacts associated with a mixed radix conversion. In effect, reverse engineering of mathematical patterns present in an encrypted data stream generated by the cryptographic system 800 is more difficult than mathematical patterns present in an encrypted data stream generated by a conventional cryptographic system.

Referring again to FIG. 8, the cryptographic system 800 is comprised of a data stream source 802, an encryption device 804 and a decryption device 806. The data stream source 802 can be comprised of hardware and/or software configured to generate a data stream. The data stream can include payload data, such as voice data, video data, user identification data, signature data and/or the like. The data stream can also be a digital data stream. The data stream source 802 is also comprised of hardware and/or software configured to communicate the data stream to the encryption device 804.

The encryption device 804 is comprised of hardware and/or software configured to generate an encryption sequence. The encryption sequence is a random number sequence which is exclusive of any statistical artifacts associated with a mixed radix conversion. The encryption device 804 is also comprised of hardware and/or software configured to perform actions to encrypt (or modify) the data stream using the encryption sequence. The encryption device 804 is further comprised of hardware and/or software configured to communicate a modified data stream to the decryption device 806. The encryption device 804 will be described in greater detail below in relation to FIG. 9.

The decryption device 806 is comprised of hardware and/or software configured to generate a decryption sequence. The decryption sequence is a random number sequence expressed in a second number base which is exclusive of any statistical artifacts associated with a mixed radix conversion. The decryption sequence can be the same as the encryption sequence generated by the encryption device 804 or may be different based on the combining method. The decryption device 806 is also comprised of hardware and/or software configured to perform actions to decrypt the received modified data stream. Such decryption actions are well known to persons skilled in the art, and therefore will not be described in great detail herein. The decryption device 806 is also comprised of hardware and/or software configured to communicate the decrypted data to an external device (not shown). The decryption device 806 will be described in greater detail below in relation to FIG. 10.

Figure 9:
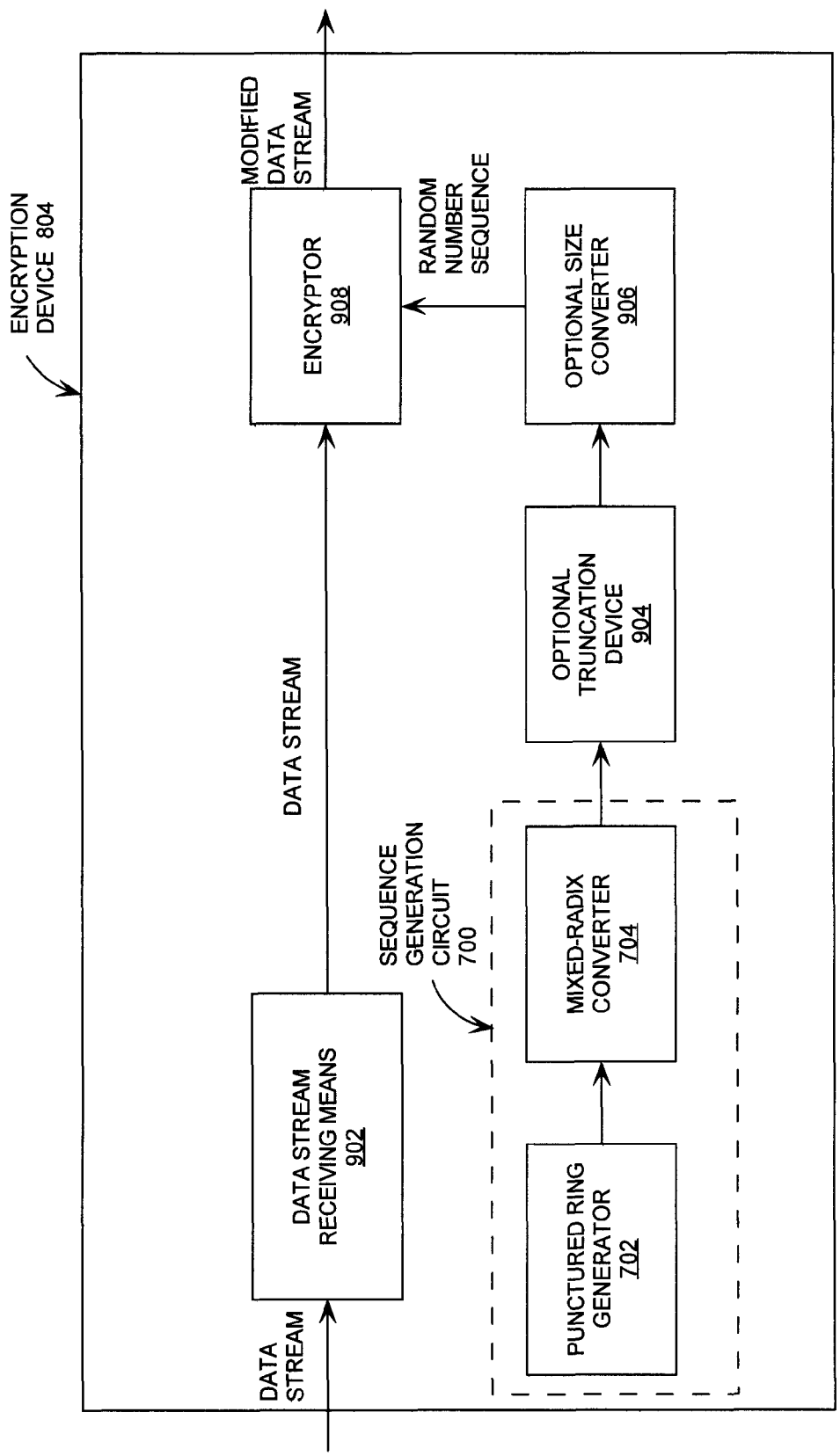
FIG. 9 is a block diagram of the encryption device of FIG. 8 that is useful for understanding the invention.

Referring now to FIG. 9, there is provided a block diagram of the encryption device 802 of FIG. 8. As shown in FIG. 9, the encryption device 802 is comprised of a data stream receiving means (DSRM) 902, a sequence generation circuit (SGC) 700, an optional truncation device 904, an optional size converter 906 and an encryptor 908. Each of the components 902, 904, 906, 908 is well known to persons skilled in the art, and therefore will not be described in great detail herein. However, a brief discussion of the encryption device 802 is provided to assist a reader in understanding the present invention.

Referring again to FIG. 9, the DSRM 902 is configured to receive an input data stream. The DSRM is also configured to communicate the input data stream to the encryptor 908. The SGC 700 is generally configured to generate an encryption sequence. The encryption sequence is a random number sequence which is exclusive of any statistical artifacts associated with a mixed radix conversion. In this regard, it should be appreciated that the SGC 700 is comprised of a punctured ring generator 702 and a mixed-radix converter 704. The discussion provided above in relation to FIG. 7 is sufficient for understanding the SGC 700.

The SGC 700 is electronically coupled to the optional truncation device 904. However, it should be appreciated that the SGC 700 can alternatively be directly coupled to the encryptor 908. The optional truncation device 904 is configured to select a truncated portion of the encryption sequence generated by the SGC 700. The phrase "truncated portion" as used herein refers to the random numbers that remain after selected random numbers are removed from a random number sequence. The optional truncation device 904 is electronically coupled to the optional size converter 906. The optional size converter 906 is configured to convert the portion of the encryption sequence from a size GF[M] to a size n if the input data stream is of a size GF[n] or GF[n/d], where d is an even divisor of n. The optional size converter 906 is electronically coupled to the encryptor 908.

The encryptor 908 is configured to generate a modified data stream by incorporating or combining the encryption sequence with the input data stream. More particularly, the encryptor 908 is configured to perform a combination method for masking a data stream. The combination method may be a standard multiplication, multiplication within a Galois extension field, addition modulo q, subtraction modulo q, bitwise logic operations or any other standard combination method. In this regard, it should be appreciated that the encryptor 908 can include a multiplier, an adder, a digital logic device, a feedback mechanism or a similar combining function device.

A person skilled in the art will appreciate that the encryption device 804 illustrates an exemplary architecture of an encryption device implementing the present invention. However, the invention is not limited in this regard and any other encryption device architecture can be used without limitation.

Figure 10:
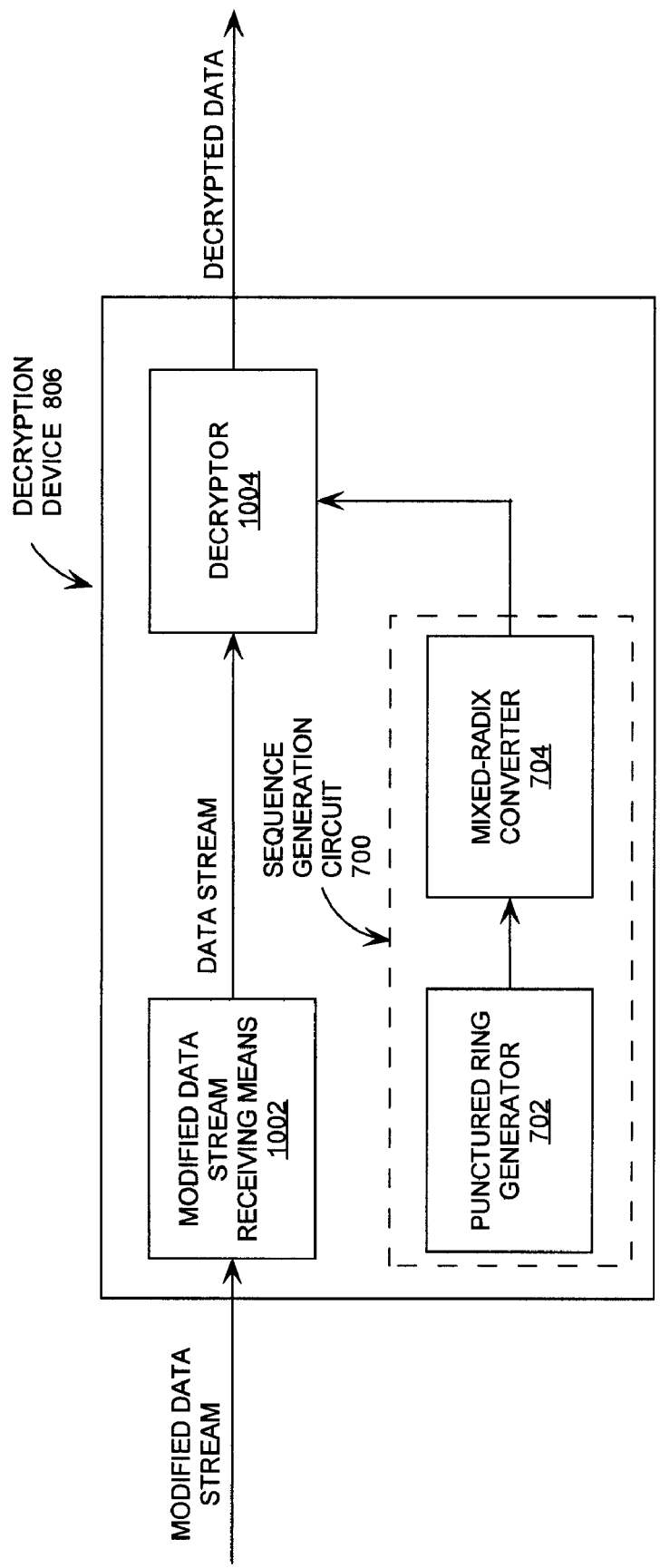
FIG. 10 is a block diagram of the decryption device of FIG. 8 that is useful for understanding the invention.

Referring now to FIG. 10, there is illustrated one embodiment of the decryption device 806 of FIG. 8. The decryption device 806 is comprised of a modified data stream receiving means (MDSRM) 1002, a sequence generation circuit (SGC) 700 and a decryptor 1004. Each of the listed components 1002, 1004 is well known to persons skilled in the art, and therefore will not be described in great detail herein. However, a brief description of the decryption device 806 is provided to assist a reader in understanding the present invention.

Referring again to FIG. 10, the MDSRM 1002 is comprised of hardware and/or software configured to receive a modified data stream from an external device, such as the encryption device 804 (described above in relation to FIG. 8). The MDSRM 1002 is also comprised of hardware and/or software configured to communicate the modified data stream to the decryptor 1004. In this regard, it should be appreciated that the modified data stream receiving means 1002 is electronically connected to the decryptor 1004.

The SGC 700 is generally configured to generate a decryption sequence. The decryption sequence is a random number sequence which is exclusive of any statistical artifacts associated with a mixed radix conversion. In this regard, it should be appreciated that the SGC 700 is comprised of a punctured ring generator 702 and a mixed-radix converter. The discussion provided above in relation to FIG. 7 is sufficient for understanding the SGC 700. The SGC 700 is electronically coupled to the decryptor 1004.

The decryptor 1004 is configured to generate decrypted data by performing a decryption method utilizing the modified data stream and the decryption sequence. Decryption methods are well known to persons skilled in the art, and therefore will not be described in great detail herein.

A person skilled in the art will appreciate that the decryption device 806 illustrates an exemplary architecture of a decryption device implementing the present invention. However, the invention is not limited in this regard and any other decryption device architecture can be used without limitation.

In light of the foregoing description of the invention, it should be recognized that the present invention can be realized in hardware, software, or a combination of hardware and software. A method of puncturing the output elements of a ring generator according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or an FPGA could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Additionally, the description above is intended by way of example only and is not intended to limit the present invention in any way, except as set forth in the following claims.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

We claim:

1. A cryptographic system, comprising:
    a data stream receiving means configured for receiving an input data stream;
    a generator configured for selectively generating a random number sequence utilizing a ring structure which has been punctured;
    a mixed radix converter coupled to said generator and configured for performing a mixed radix conversion to convert said random number sequence from a first number base to a second number base;
    an encryptor coupled to said data stream receiving means and said mixed radix converter, said encryptor configured for generating an modified data stream by combining said random number sequence in said second number base with said input data stream; and
    wherein said ring structure which has been punctured and said mixed radix converter are configured in combination to produce a random number sequence in said second number base which is exclusive of any statistical artifacts associated with said mixed radix conversion.

2. The cryptographic system according to claim 1, wherein said first number base and said second number base are respectively defined by a first Galois field characteristic and a second Galois field characteristic.

3. The cryptographic system according to claim 2, wherein said first Galois field characteristic is mutually prime with respect to said second Galois field characteristic.

4. The cryptographic system according to claim 2, wherein said second Galois field characteristic is selected as a finite field size which is smaller as compared to a finite field size of a first Galois field.

5. The cryptographic system according to claim 4, wherein said ring structure which has been punctured comprised n element(s) which have been removed therefrom to eliminate at least one statistical artifact in said random number sequence expressed in said second number base, wherein n is determined based on a mathematical relation between a number of elements in said first Galois field and a number of elements in a second Galois field.

6. The cryptographic system according to claim 5, wherein n is determined based on a remainder value resulting from a quotient of said number of elements in said first Galois field divided by said number of elements in said second Galois field.

7. The cryptographic system according to claim 6, wherein said mixed radix conversion produces a plurality of equivalence classes in said second number base, and said n elements which have been removed from said ring structure are selected to ensure that each equivalence class has an equal or desired number of elements after said mixed radix conversion.

8. The cryptographic system according to claim 1, wherein said encryptor includes at least one of a multiplier, an adder, a digital logic device and a feedback mechanism.

9. The cryptographic system according to claim 1, where in said encryptor is configured for performing at least one of a standard multiplication operation, a multiplication in a Galois extension field operation, an addition modulo q operation, a subtraction modulo q operation and a bitwise logic operation.

10. The cryptographic system according to claim 1, further comprising a truncation device coupled to said mixed radix converter and configured for selecting a truncated portion of said random number sequence in said second number base.

11. The cryptographic system according to claim 10, further comprising a size converter coupled between said truncation device and said encryptor, said size converter configured for converting said truncated portion from a size GF[M] to a size n if said input data stream is of a size GF[n] or GF[n/d], where d is an even divisor of n.

12. The cryptographic system according to claim 1, wherein said input data stream is expressed in said second number base.

13. The cryptographic system according to claim 1, wherein chosen statistical artifacts with a priori defined statistical distributions are induced into said random number sequence expressed in said second number base.

14. The cryptographic system according to claim 1, further comprising a second ring structure and a second mixed radix converter configured in combination to produce a decryption sequence.

15. The cryptographic system according to claim 14, further comprising a modified data stream receiving means, a decryptor electronically connected to said modified data stream receiving means, and said second mixed radix converter, wherein said decryptor is configured for generating decrypted data by performing a decryption method utilizing said modified data stream and said decryption sequence.

16. A cryptographic system, comprising:
 a data stream receiving means configured for receiving an input data stream;
 a generator configured for selectively generating a random number sequence utilizing a ring structure which has been punctured;
 a mixed radix converter coupled to said generator and configured for performing a mixed radix conversion to convert said random number sequence from a first number base to a second number base;
 a truncation device coupled to said mixed radix converter and configured for selecting a truncated portion of said random number sequence in said second number base
 an encryptor coupled to said data stream receiving means and said truncation device, said encryptor configured for generating a modified data stream by combining said random number sequence in said second number base with said input data stream; and
 wherein said ring structure which has been punctured and said mixed radix converter are configured in combination to produce a random number sequence in said second number base which is exclusive of any undesired statistical artifacts associated with said mixed radix conversion.

17. The cryptographic system according to claim 16, further comprising a second ring structure and a second mixed radix converter configured in combination to produce a decryption sequence.

18. The cryptographic system according to claim 17, further comprising a modified data stream receiving means, a decryptor electronically connected to said modified data stream receiving means, and said second mixed radix converter, wherein said decryptor is configured for generating decrypted data by performing a decryption method utilizing said modified data stream and said decryption sequence.

19. The cryptographic system according to claim 16, further comprising a size converter coupled between said truncation device and said encyrptor, said size converter configured for converting said truncated portion from a size GF[M] to a size n if said input data stream is of a size GF[n] or GF[n/d], where d is an even divisor of n.

\* \* \* \* \*